(12) United States Patent
Kim

(10) Patent No.: US 7,258,095 B2
(45) Date of Patent: Aug. 21, 2007

(54) OIL SUPPLY APPARATUS FOR ENGINE

(75) Inventor: Yong Woo Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/333,561

(22) Filed: Jan. 17, 2006

(65) Prior Publication Data

US 2007/0107690 A1    May 17, 2007

(30) Foreign Application Priority Data

Nov. 15, 2005  (KR) .................. 10-2005-0109196

(51) Int. Cl.
*F01M 1/02* (2006.01)
*F02B 41/00* (2006.01)
(52) U.S. Cl. .............................. 123/196 R; 123/198 C
(58) Field of Classification Search ............ 123/196 R, 123/198 C
See application file for complete search history.

(56) References Cited

U.S. PATENT DOCUMENTS 5,791,311 A  *  8/1998  Ozeki .................... 123/196 R

FOREIGN PATENT DOCUMENTS

| JP | 59079045 A | * | 5/1984 |
| JP | 06299863 A | * | 10/1994 |
| JP | 07189638 A | * | 7/1995 |

* cited by examiner

*Primary Examiner*—Noah P. Kamen
(74) *Attorney, Agent, or Firm*—Morgan Lewis & Bockius LLP

(57) ABSTRACT

An oil supply apparatus for an engine includes an oil pan located beneath the engine to store oil therein, an oil pump mounted in the oil pan to pump the oil stored in the oil pan, and a chain-drive unit mounted between the oil pump and a crankshaft of the engine to transmit a rotating force of the crankshaft to the oil pump. The chain-drive unit is partially immersed in the oil stored in the oil pan. With this configuration, there is no need for separate elements for lubricating the chain-drive unit, whereby the overall structure of the oil supply apparatus can be simplified. This results in a reduction in the number of elements and manufacturing costs.

7 Claims, 3 Drawing Sheets

OIL SUPPLY APPARATUS FOR ENGINE

CROSS-REFERENCE TO RELATED APPLICATION

This application claims priority to and the benefit of Korean Patent Application No. 10-2005-0109196 filed in the Korean Intellectual Property Office on Nov. 15, 2005, the entire contents of which are incorporated herein by reference.

BACKGROUND OF THE INVENTION

1. Field of the Invention

The present invention relates to an oil supply apparatus for supplying oil to respective elements of an engine to be lubricated. More particularly, the present invention relates to an oil supply apparatus in which a power-transmission unit, used to transmit the rotating force of a crankshaft to an oil pump, is mounted to be partially immersed in lubricating oil for effective lubrication thereof.

2. Description of the Related Art

Generally, oil supply apparatus for engines are classified as a direct-connection type in which an oil pump is directly connected to a crankshaft of the engine to pump oil when the crankshaft rotates, or a chain-drive type in which the crankshaft is connected to the oil pump by use of a chain so that a rotating force of the crankshaft is transmitted to the oil pump via the chain.

Conventional, chain driven oil supply apparatus can exhibit several problems. For example, a complicated structure, a large number of elements, and excessive manufacturing costs can arise due to the use of an oil injection nozzle and an oil supply line to lubricate the chain-drive mechanism.

SUMMARY OF THE INVENTION

Embodiments of the present invention provide an oil supply apparatus for an engine in which a chain-drive mechanism is partially immersed in lubricating oil stored in an oil pan to eliminate the need of separate lubricating elements for the chain-drive mechanism, whereby the overall configuration of the oil supply apparatus can be simplified and the number of elements and manufacturing costs thereof can be reduced.

In accordance with an exemplary embodiment of the present invention an oil supply apparatus for an engine comprises: an oil pan located beneath the engine to store oil therein, an oil pump mounted in the oil pan to pump the oil stored in the oil pan, and a chain-drive unit mounted between the oil pump and a crankshaft of the engine to transmit a rotating force of the crankshaft to the oil pump, the chain-drive unit being partially immersed in the oil stored in the oil pan.

The chain-drive unit may include a driving sprocket mounted on the crankshaft to simultaneously rotate with the crankshaft, a driven sprocket mounted on a rotating shaft of the oil pump to be immersed in the oil stored in the oil pan, and a chain engaged with both the driving sprocket and the driven sprocket.

The oil pan may include an upper oil pan coupled to a lower end of the engine in a sealing manner, and a lower oil pan coupled to a lower end of the upper oil pan in a sealing manner, the oil being stored in the lower oil pan.

The upper oil pan may include a guide portion having a downwardly inclined bottom surface to guide oil dropped from the interior of the engine into the lower oil pan, and a pocket portion perforated at an end of the guide portion while being coupled to the lower oil pan, the oil pump and the chain-drive unit being mounted in the pocket portion. The pocket portion may be provided at a sidewall thereof with a sprocket seat, so that the driven sprocket and the chain of the chain-drive unit are rotatably received in the sprocket seat while being immersed in the oil.

BRIEF DESCRIPTION OF THE DRAWINGS

Features and other advantages of the present invention will be more clearly understood from the following detailed description taken in conjunction with the accompanying drawings, in which.

DESCRIPTION OF THE PREFERRED EMBODIMENTS

Now, exemplary embodiments of the present invention will be explained with reference to the accompanying drawings.

Figure 1:
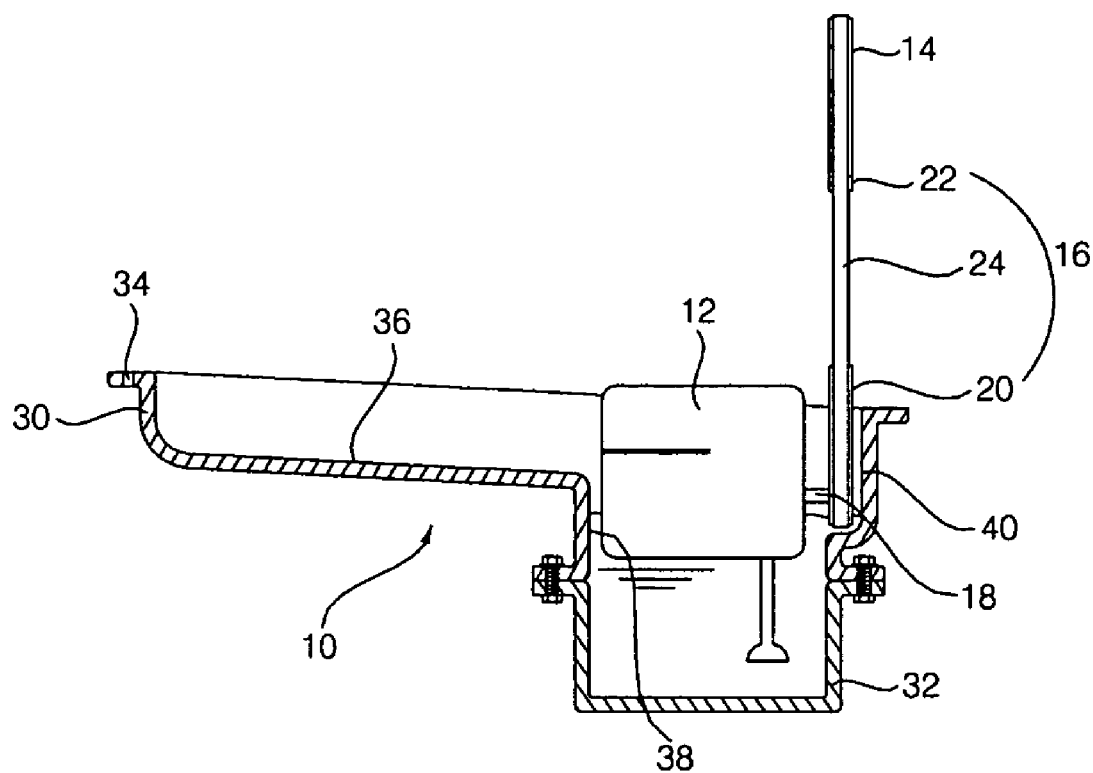
FIG. 1 is a sectional view of an oil supply apparatus according to the present invention.
Figure 2:
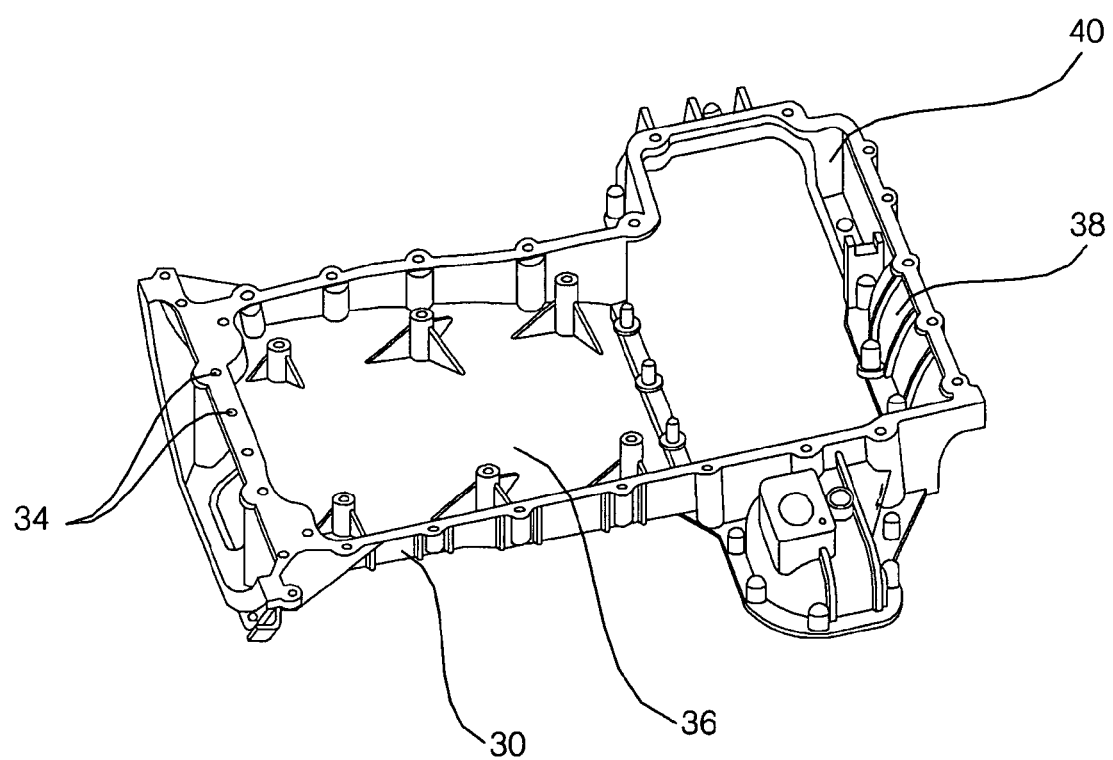
FIG. 2 is a perspective view of an oil pan according to the present invention.
Figure 3:
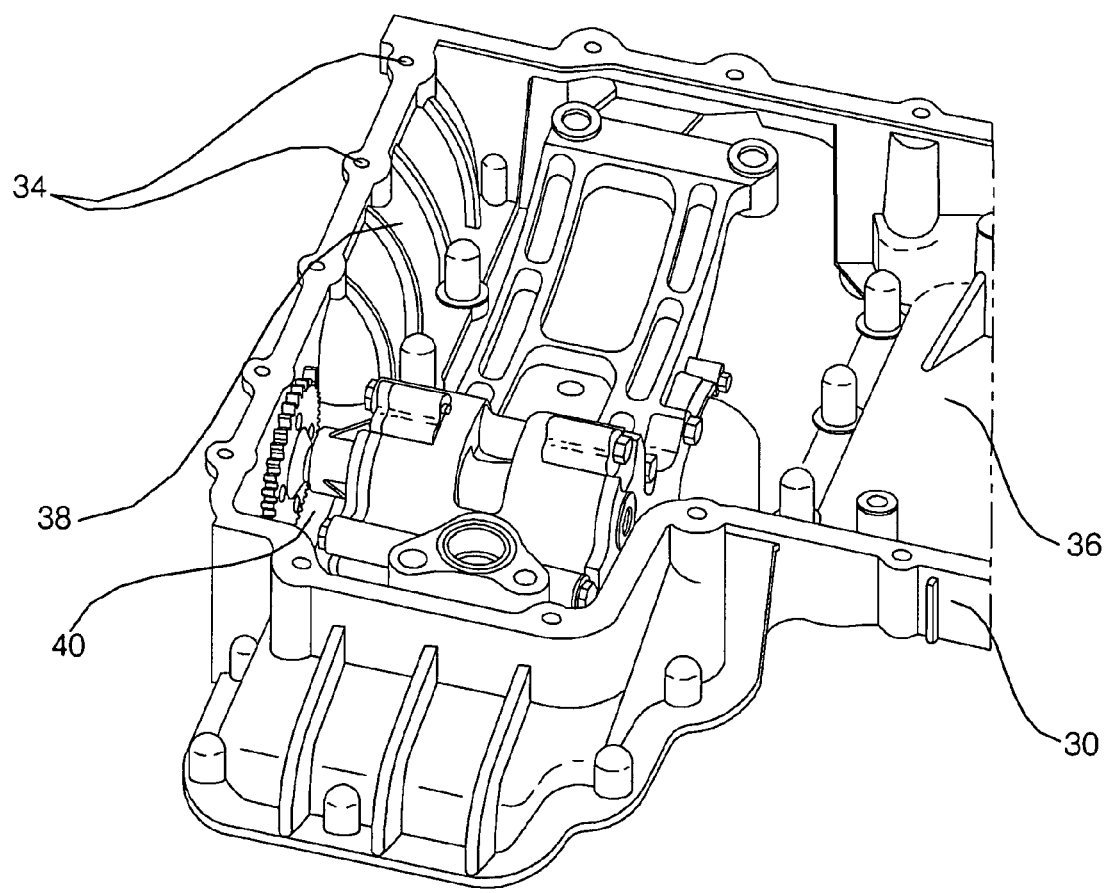
FIG. 3 is a perspective view of the oil pan, into which an oil pump and a sprocket according to the present invention are mounted.

Referring to FIGS. 1-3, an embodiment of an oil supply apparatus for an engine according to the present invention comprises an oil pan 10 located beneath the engine to store oil therein; an oil pump 12 mounted in the oil pan 10 to pump the oil stored in the oil pan 10, in order to supply the oil to respective elements of the engine to be lubricated; and a chain-drive unit 16 mounted between the oil pump 12 and an engine crankshaft 14 to transmit a rotating force of the crankshaft 14 to the oil pump 12. The chain-drive unit 16 is mounted to be partially immersed in the oil stored in the oil pan 10.

The chain-drive unit 16 includes a driving sprocket 22 mounted on the crankshaft 14 to simultaneously rotate with the crankshaft 14; a driven sprocket 20 mounted on a rotating shaft 18 of the oil pump 12 to be located inside the oil pan 10; and a chain 24 engaged with both the driving sprocket 22 and the driven sprocket 20 to transmit a rotating force of the driving sprocket 22 to the driven sprocket 20.

Here, the driven sprocket 20 is partially immersed in the oil stored in the oil pan 10. Accordingly, the chain 24, which is engaged with the driven sprocket 20, is also partially immersed in the oil.

In one embodiment of the present invention, the oil pan 10 is divided into an upper oil pan 30 and a lower oil pan 32. The upper oil pan 30 is coupled to a lower end of the engine in a sealing manner, and in turn, the lower oil pan 32 is coupled to a lower end of the upper oil pan 30 in a sealing manner. The oil is stored in the lower oil pan 32.

The upper oil pan 30 is formed along an upper end surface thereof with a plurality of bolt-fastening holes 34, so that the upper oil pan 30 is bolted to the lower end of the engine. A part of the upper oil pan 30 forms a guide portion 36 having a downwardly-inclined bottom surface to guide oil dropped from the interior of the engine into the lower oil pan 32. The remaining part of the upper oil pan 30 forms a pocket portion 38 perforated at an end of the guide portion 36. The lower oil pan 32 is bolted to the perforated pocket portion 38, and the oil pump 12 and the chain-drive unit 16 are mounted in the pocket portion 38.

Since the pocket portion 38 has a perforated shape, in a state wherein the lower oil pan 32 is coupled to a lower end of the pocket portion 38 in a sealing manner and the oil pump 12 is mounted inside the pocket portion 38, the oil pump 12 acts to pump the oil stored in the lower oil pan 32, allowing both the driven sprocket 20 and the chain 24 of the chain-drive unit 16 to be partially immersed in the pumped oil.

To rotatably receive the driven sprocket 20 engaged with the chain 24, the pocket portion 38 is provided at a sidewall thereof with a sprocket seat 40.

The sprocket seat 40 is outwardly recessed from the sidewall of the pocket portion 38.

As stated above, the lower oil pan 32 is coupled to the lower end of the pocket portion 38 in a sealing manner. In this case, even if the level of the oil is lowered during operation of the engine, the oil always remains inside the pocket portion 38, to lubricate the chain-drive unit 16.

The sprocket seat 40 is configured so that the driven sprocket 20 and the chain 24 are immersed in the oil at a predetermined height while preventing the oil from reaching an initial junction between the driven sprocket 20 and the chain 24. This prevents air bubbles from being generated at the initial junction between the driven sprocket 20 and the chain 24.

Alternatively, in a second embodiment of the present invention, the oil pan may have an integral shape rather than being divided into the upper and lower oil pans 30 and 32.

The oil pan of the second embodiment includes an oil guide portion, a pocket portion, and an oil storage portion. The oil guide portion is coupled to the lower end of the engine in a sealing manner and having a downwardly inclined bottom surface to guide oil dropped from the interior of the engine into the oil storage portion. The pocket portion is perforated at an end of the guide portion so that the oil pump and the chain-drive unit are mounted therein. The oil storage portion is integrally formed at a lower end of the pocket portion to store oil therein.

As is apparent from the above description, the present invention provides an oil supply apparatus for an engine in which a chain-drive unit, used to transmit a rotating force of an engine crankshaft to an oil pump, is partially immersed in lubricating oil stored in an oil pan. With this configuration, the chain-drive unit can be effectively lubricated without using separate lubricating elements. This has the effect of simplifying the overall structure of the oil supply apparatus, and achieving a reduction in the number of elements and manufacturing costs.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An oil supply apparatus for an engine, comprising:
   an oil pan configured and dimensioned to be disposed beneath the engine to store oil therein;
   an oil pump mounted in the oil pan to pump the oil stored in the oil pan; and
   a chain-drive unit configured for mounting between the oil pump and a crankshaft of the engine to transmit a rotating force of the crankshaft to the oil pump, the chain-drive unit mounted partially immersed in the oil stored in the oil pan;
   wherein the oil pan includes:
      an upper oil pan configured and dimensioned for coupling to a lower end of the engine in a sealing manner; and
      a lower oil pan coupled to a lower end of the upper oil pan in a sealing manner, the oil being stored in the lower oil pan;
   and wherein the upper oil pan includes:
      a guide portion having a downwardly inclined bottom surface to guide oil dropped from the interior of the engine into the lower oil pan; and
      a pocket portion perforated at an end of the guide portion while being coupled to the lower oil pan, the oil pump and the chain-drive unit being mounted in the pocket portion.

2. The apparatus as set forth in claim 1, wherein the chain-drive unit includes:
   a driving sprocket configured for mounting on the crankshaft to simultaneously rotate with the crankshaft;
   a driven sprocket mounted on a rotating shaft of the oil pump to be immersed in the oil stored in the oil pan; and
   a chain engaged with both the driving sprocket and the driven sprocket.

3. The apparatus as set forth in claim 1, wherein the pocket portion is provided at a sidewall thereof with a sprocket seat, so that the driven sprocket and the chain of the chain-drive unit are rotatably received in the sprocket seat while being immersed in the oil.

4. The apparatus as set forth in claim 3, wherein the sprocket seat is outwardly recessed from the sidewall of the pocket portion.

5. An oil supply apparatus for an engine, comprising:
   an oil pan configured and dimensioned to be disposed beneath the engine to store oil therein;
   an oil pump mounted in the oil pan to pump the oil stored in the oil pan; and
   a chain-drive unit configured for mounting between the oil pump and a crankshaft of the engine to transmit a rotating force of the crankshaft to the oil pump, the chain-drive unit mounted partially immersed in the oil stored in the oil pan;
   wherein the oil pan includes:
      a guide portion configured and dimensioned to be coupled to a lower end of the engine in a sealing manner and having a downwardly inclined bottom surface to guide oil dropped from the interior of the engine downward;
      a pocket portion perforated at an end of the guide portion, the oil pump and the chain-drive unit being mounted in the pocket portion; and
      an oil storage portion integrally formed at a lower end of the pocket portion to store oil therein.

6. The apparatus as set forth in claim 5, wherein the pocket portion is provided at a sidewall thereof with a sprocket seat, so that the driven sprocket and the chain of the chain-drive unit are rotatably received in the sprocket seat while being immersed in the oil.

7. The apparatus as set forth in claim 6, wherein the sprocket seat is outwardly recessed from the sidewall of the pocket portion.

* * * * *